Figure 1:
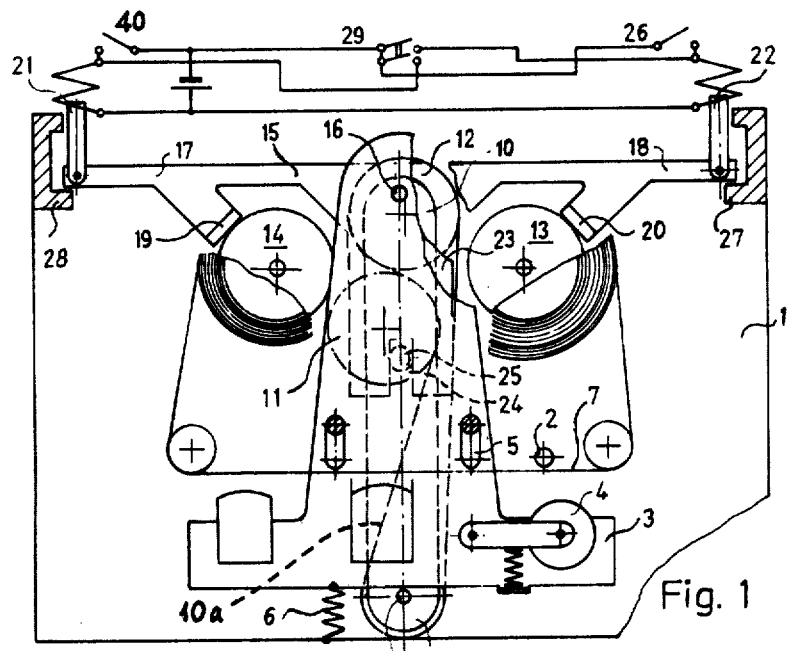

United States Patent [19]

Weisser

[11] 4,303,954
[45] Dec. 1, 1981

[54] CONTROL DEVICE FOR A TAPE RECORDER

[75] Inventor: Fritz Weisser, St. Georgen, Fed. Rep. of Germany

[73] Assignee: Dual Gebruder Steidinger GmbH & Co., St. Georgen, Fed. Rep. of Germany

[21] Appl. No.: 127,704

[22] Filed: Mar. 6, 1980

[51] Int. Cl.³ .............................................. G11B 15/00
[52] U.S. Cl. .................................................. 360/90
[58] Field of Search .................... 360/90, 92, 93, 96.1, 360/96.3, 96.4, 96.6, 105, 69, 74.1; 242/197–201

[56] References Cited
U.S. PATENT DOCUMENTS 4,131,922 12/1978 Yoshida et al. ...................... 360/90
4,225,894 9/1980 Fulukawa et al. ................. 360/96.3

*Primary Examiner*—John H. Wolff
*Attorney, Agent, or Firm*—Martin A. Farber

[57] ABSTRACT

A control device, actuatable by electric solenoids, for the drive unit of a tape recorder, in which the tape, in addition to the normal forward for recording and playback can also run fast forward or reverse, all three drive settings being obtainable with only two solenoids, which solenoids act on two opposite arm ends of a T-shaped lever which has a centrally located pivot bearing. The lever can also be translated in a cross direction and is pulled by a spring against abutments which are disposed opposite the solenoids, so that by suitable switching of the solenoids it can be rotated or even only translated. By the translation the normal forward speed can be set and upon rotation the fast forward or fast reverse can be set by the third arm of the lever.

4 Claims, 2 Drawing Figures

CONTROL DEVICE FOR A TAPE RECORDER

This invention relates to a control device for a tape recorder which has a drive unit which can be set by electric solenoids for the fast forward winding or fast rewinding of a tape resting on reel discs located alongside of each other, and also has a pressure roller which can also be controlled by an electric solenoid and be brought, against spring means, from its position of rest into its operating position, in which it presses against the capstan.

Such devices are suitable for remote control, since the mechanical setting operations which are necessary for operating of the machine can be effected by the closing of circuits for electric solenoids. In this connection three setting operations or setting movements are generally involved, namely first of all the setting of the normal forward speed of the tape for purposes of recording or playback, which is effected by bringing the pressure roller against the capstan, the tape being guided such that at all times it lies between the two of them. Frequently the bringing of the magnetic head into its operating position is also simultaneously effected thereby. Secondly, by reversing the first setting operation, the setting of the fast forward mode is brought about and, thirdly, the setting of fast rewind of the tape, which is effected by engagement of corresponding couplings or friction wheels. The devices known up to the present time use respectively separate solenoids for each of these setting processes.

The object of the present invention is to simplify the control means so that, in particular, only two solenoids are required for the three setting operations.

Accordingly the invention provides a control device for a tape recorder which has a drive unit which can be set by solenoids for the fast forward winding or rewinding of a tape resting on reel discs which lie alongside each other, and also has a pressure roller which is also controllable by a solenoid and can be brought, against spring means, out of a position of rest into its operating position in which it operatively presses against the capstan, characterized in that a T-shaped lever (15) is swingably supported around a centrally located pivot (16) on a mount (3) which can bring the pressure roller (4) into its operating position, each of the opposite arms (17, 18) of the T-shaped lever being pulled by the spring means (6) which holds the pressure roller (4) out of an operating position, against respectively a separate abutment (14, 28; 13, 27), which abutments are located such that these two arms (17, 18) assume a neutral central position in which they lie substantially transverse to the direction of movement of the mount (3) for the pressure roller (4) and can be lifted away from the abutments (14,28; 13, 27) by means of two solenoids (21, 22) each of which acts on one end thereof, the third arm (23) of the T-shaped lever being connected via coupling means (24, 25) which are operative or effective only with respect to rotation, to a setting lever (10) for the setting of fast forward or fast rewind from a neutral central position, the T-shaped lever (15) upon the attraction of one of the solenoids (21,22) being pivoted to such an extent about the end of the opposite arm (18, 17) abutting at the time against the abutment (13, 27; 14, 28) that it sets fast forward or rewind, the displacement of the pivot bearing (16) of the T-shaped lever (15) and of the mount (3) associated with it for the pressure roller (4), which displacement is of an amount equal to only about half of the solenoid stroke, moving the pressure roller (4) only approximately half the way into its operating position, so that it passes into its operating position only upon simultaneous attraction of both solenoids (21, 22).

Also, according to the invention, under the action of the spring means (6) acting on the opposite arms (17, 18) of the T-shaped lever (15), the engagement of these arms, respectively, against one of the reel discs (14, 13) is effected by the application of a brake shoe (19, 20) arranged on each of the arms (17, 18) as well as a further engagement, by the application of each of these arms (17, 18) against an abutment (28, 27) which is fixed to the device, which abutment is located further from the centrally located pivot bearing (16) of the T-shaped lever (15) than the point of application of the brake shoes (19, 20), so that even upon the attraction of only one of the solenoids (21, 22) both brake shoes (19, 20) are lifted away from the reel discs.

According to the invention, a further simplification is obtained in that the T-shaped lever, which is present in any event, is simultaneously used as brake lever for both winding discs.

Figure 2:
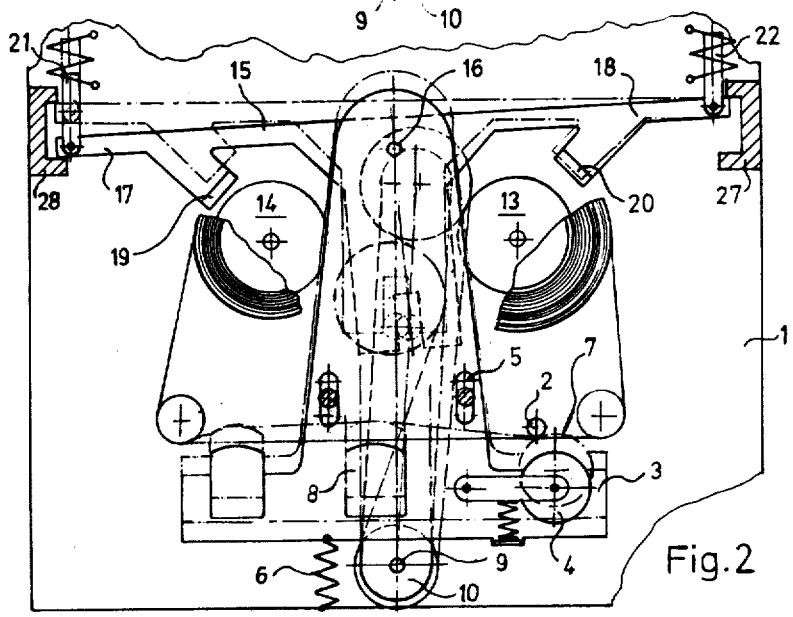

With the above and other objects and advantages in view, the present invention will become more clearly understood in connection with the detailed description of a preferred embodiment, when considered with the accompanying drawing, of which:

FIG. 1 shows the essential parts of a tape recorder, insofar as they form part of the control device concerned here, shown in the position of rest of the drive; and FIG. 2 shows the same arrangement in one of the operating positions of the drive.

A base plate 1 carries a motor-driven capstan 2. Opposite it, a pressure roller 4 is elastically supported on a mounting 3. The mount 3 is displaceable on the base plate 1 by means of a guide slot 5. The pressure roller 4 is maintained at a distance spaced away from the capstan 2 by a spring 6. The recording tape 7 passes between the capstan 2 and the pressure roller 4. A magnetic head 8 is also mounted on the mount 3. A setting lever 10 for setting fast forward or rewind is pivotally mounted around a pin 9 on the base plate 1. The lever 10 carries two friction wheels 11, 12 which are driven in opposite directions by means of a belt 10a, and which, upon the swinging of the setting lever 10 to the right or left from its neutral central position (FIG. 1), can be drivingly coupled with one of the reel discs 13, 14, respectively.

A T-shaped lever 15 is swingably mounted on a centrally located pivot bearing 16 on the mount 3 of the pressure roller 4. The two opposite arms 17, 18 of the lever 15 have projections which are formed as brake shoes 19, 20 each abuttingly engaging respectively against one reel disc 13, 14, the latter acting as abutments, and indeed under the action of the spring 6 which pulls the mount 3 and the pressure roller 4 away from the capstan 2. A solenoid 21, 22, respectively, is attached to each of the opposite arms 17, 18 of the T-shaped lever 15. The third arm 23 of the T-shaped lever 15 is coupled, via coupling means 24, 25 comprising a parallel guide slot 24 and a pin 25 sliding therein, to the setting lever 10 for the setting of fast forward or rewind.

FIG. 1 shows the position of rest of the control device, in which the pressure roller 4 is lifted away from the capstan 2 by the action of the spring 6, and the T-shaped lever 15, as well as the setting lever 10 for the setting of the fast forward or rewind which is coupled thereto are held in the neutral central position, the T-shaped lever 15 braking both reel discs 13, 14. The angular position of the brake shoes 19, 20 is so selected that the amount of the braking action is dependent on the direction of rotation, so that the reel which is unwinding at the time is always braked more strongly than the winding reel, so as to avoid the formation of a loop in the tape upon stopping.

If the solenoid 22 is set for fast forward and actuated by means of the corresponding "fast-forward" button 26, it lifts the T-shaped lever 15 on one side (FIG. 2). The rotation of the T-shaped lever 15 about its point of support on the abutment stop 28 which is thereby brought about, is transmitted, via the parallel guide 24 and the pin 25, to the shift lever 10, which thereby brings the friction wheel 12 serving the drive for fast forward into engagement with the reel disc 13. The centrally located pivot bearing 16 of the T-shaped lever 15 has in this connection moved over only about one-half of the way which the mount 3 of the pressure roller is required to move in order to reach the operating position of the pressure roller 4. Furthermore the T-shaped lever 15 has first lifted its brake shoe 20 off from the reel disc 13 and subsequently lifted its brake shoe 19 off from the reel disc 14, so that unimpeded winding can take place.

It is clear that the arrangement of the brake shoes 19, 20 on the T-shaped lever 15 merely represents an advantageous additional optional use of this lever and does not constitute a prerequisite for the use of the generic invention.

Pressing the "fast-reverse" button 40 causes the solenoid 21 to lift the T-shaped lever 15 on the left side, (not shown), whereby the rotation of the lever 15 via the guide 24 and pin 25 pivots the shift lever 10 to the left about its pivot point 9 such that the friction wheel 11 engages the reel disc 14. Here also the movement of the lever 15 and the pivot bearing 16 are sufficient to not cause the pressure roller 4 and the magnetic head 8 to operatively engage the tape 7. Also the lever first lifted its brake shoe 19 from the reel disc 14 and thereafter the brake shoe 20 from the reel disc 13 so that unimpeded winding can occur.

If both solenoids 21, 22, are actuated by means of the "normal forward" button 29, then both opposite arms 17, 18 of the T-shaped lever 15 are lifted with the full stroke of the solenoids 21, 22. Since this results in merely a parallel displacement, this movement does not result in any displacement of the shift lever 10 for fast winding since this movement conforms with the direction of displacement of the parallel guide 24, 25. However, the pressure roller 4 and the magnetic head 8 are brought into their operating position, with the pressure roller 4 pressing the magnetic tape 7 against the capstan 2 (position shown in dash-dot lines in FIG. 2).

While there has been disclosed one embodiment of the invention it is to be understood that this embodiment is given by example only and not in a limiting sense.

I claim:

1. A control device for a tape recorder having a drive means for fast forward winding and fast reverse winding of a magnetic tape resting on reel discs which are arranged alongside each other on a base plate, comprising a capstan being mounted on the base plate, a mount being movably mounted on the base plate in a direction of movement between an operating position and a rest position, a pressing roller being mounted on said mount and cooperatively disposed relative to said capstan such that said roller presses the magnetic tape against the capstan when the mount is in the operating position, a pivot bearing being centrally disposed on said mount, spring means acting on said mount for biasing said mount out of the operating position, a T-shaped lever swingably supported on said mount around said pivot bearing, said T-shaped lever includes two opposite arms and a third arm, abutments fixed relative to said T-shaped lever, said two opposite arms of said T-shaped lever under the action of said spring means and via said mount, abutting against said abutments, respectively, in said rest position and holding therewith said T-shaped lever in a neutral center position in which said two opposite arms lie substantially in a direction transverse to the direction of movement of said mount, means comprising a setting lever having a neutral central position and for optionally setting fast forward and reverse positions, respectively, starting from the neutral central position, coupling means being disposed between and coupling said setting lever and said third arm of said T-shaped lever, said coupling means for holding said setting lever in the neutral central position when said T-shaped lever is not pivoted, and said coupling means for otherwise transmitting only a pivoting movement of said T-shaped lever to said setting lever such that said setting lever moves out of said neutral central position into said fast forward and reverse positions, respectively, two electric solenoids each being operatively disposed to act on one of said two opposite arms of said T-shaped lever, respectively, a solenoid stroke of one of said solenoids, respectively, each being dimensioned such that when only one of said two solenoids is actuated a corresponding one of said two opposite arms is drawn away from a corresponding one of said abutments and said T-shaped lever pivots about the other of said abutments and by means of said T-shaped lever and said coupling means said setting lever is settable into said fast forward and reverse positions, respectively, and therewith said pivot bearing of said T-shaped lever and said mount are displaced to an extent only equal to approximately half the solenoid stroke, moving said mount and said pressing roller only about half the way from said rest position to said operating position, said mount and said pressing roller being in said operating position only with simultaneous actuation of and attraction of both said solenoids and said two opposite arms of said T-shaped lever substantially without pivoting thereof and thereby displacement of said pivot bearing and said mount.

2. A control device for a tape recorder having a drive means for fast forward winding and fast reverse winding of a magnetic tape resting on reel discs which are arranged alongside each other on a base plate, comprising
- a housing, the base plate mounted on said housing,
- a capstan mounted on the base plate,
- a mount being movably mounted on the base plate in a direction of movement between an operating position and a rest position,
- a pressing roller being mounted on said mount and cooperatively disposed relative to said capstan such that said roller presses the magnetic tape against the capstan when the mount is in the operating position,
- a pivot bearing being centrally disposed on said mount,
- spring means acting on said mount for biasing said mount out of the operating position,
- a T-shaped lever swingably supported on said mount around said pivot bearing,
- said T-shaped lever includes two opposite arms and a third arm,
- two brake shoes mounted on said two opposite arms, respectively, of said T-shaped lever and under the action of said spring means and via said mount abutting against the reel discs, respectively, in said rest position, and therewith holding said T-shaped lever in a neutral center position in which said two opposite arms of the T-shaped lever lie substantially in a direction transverse to the direction of movement of said mount,
- means comprising two abutments fixed to said housing and arranged such that under the action of said spring means and via said mount, for holding said T-shaped lever substantially in the same said neutral center position as held by said brake shoes, said two abutments being spaced a greater distance apart from each other than that of said two brake shoes,
- means comprising a setting lever having a neutral central position and for optionally setting fast forward and reverse positions, respectively, from out of the neutral central position,
- coupling means being disposed between and coupling said setting lever and said third arm of said T-shaped lever, said coupling means for holding said setting lever in the neutral central position when said T-shaped lever is not pivoted, and said coupling means for otherwise transmitting only a pivoting movement of said T-shaped lever to said setting lever such that said setting lever moves out of said neutral central position thereof into said fast forward and reverse positions, respectively,
- two electric solenoids each being operatively disposed to act on one of said two opposite arms of said T-shaped lever, respectively, a solenoid stroke of one of said solenoids, respectively, each being dimensioned such that when only one of said two solenoids is actuated a corresponding one of said two opposite arms is drawn away from a corresponding one of said abutments and said T-shaped lever pivots about the other of said abutments and by means of said T-shaped lever and said coupling means said setting lever is settable into said fast forward and reverse positions, respectively, and therewith said pivot bearing of said T-shaped lever and said mount are displaced to an extent only equal to approximately half the solenoid stroke, moving said mount and said pressing roller only about half the way from the rest position to said operating position,
- said mount and said pressing roller being in said operating position only with simultaneous actuation of and attraction of both said solenoids of said two opposite arms of said T-shaped lever substantially without pivoting thereof and thereby displacement of said pivot bearing and said mount.

3. The control device as set forth in claim 1 or 2, wherein
said setting lever is pivotally mounted on said base plate.

4. The control device as set forth in claim 1 or 2, wherein
said coupling means constitutes a parallel guide formed on one of said levers and a pin formed on the other of said levers, said pin is slidably disposed in said guide.

* * * * *